Aug. 15, 1939.   V. L. RONCI   2,169,570
SEALED JOINT FOR CONDUCTORS
Filed April 23, 1936
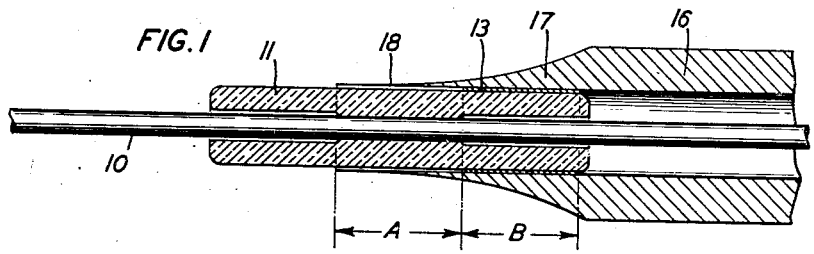
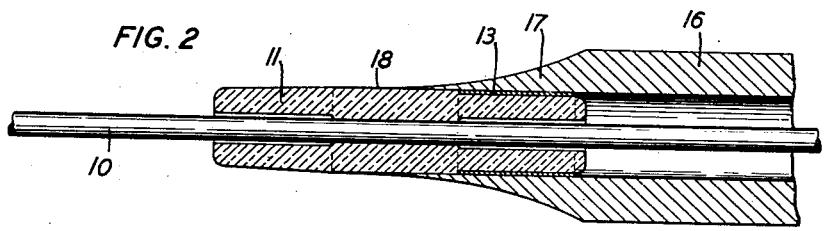
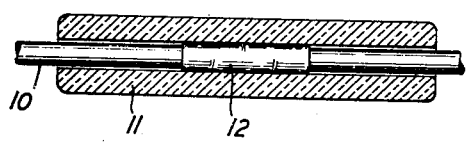
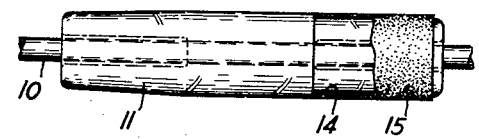
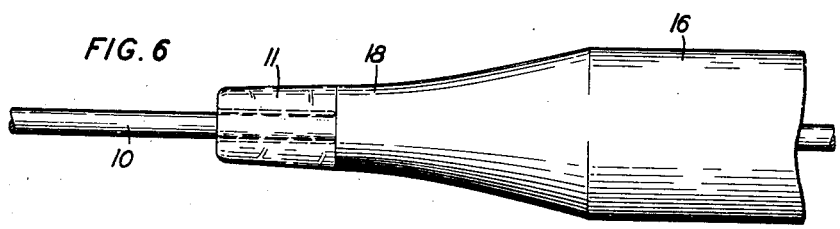
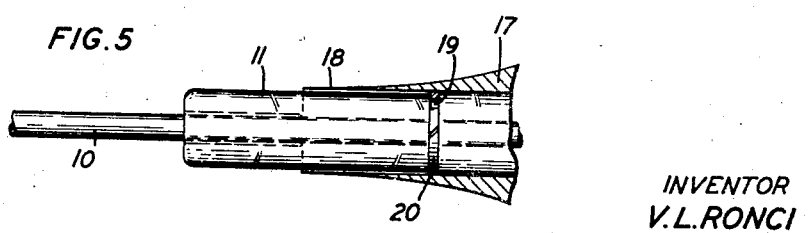
INVENTOR
V. L. RONCI
BY
*Walter C. Kiesel*
ATTORNEY Patented Aug. 15, 1939

2,169,570

UNITED STATES PATENT OFFICE 2,169,570

SEALED JOINT FOR CONDUCTORS

Victor L. Ronci, Brooklyn, N. Y., assignor to Bell Telephone Laboratories, Incorporated, New York, N. Y., a corporation of New York Application April 23, 1936, Serial No. 75,927

14 Claims. (Cl. 174—77)

This invention relates to sealed joints for conductors and a method of forming the same, and more particularly to the sealing of a conductor subjected to high external pressures or excessive hydrostatic pressures.

An object of this invention is to hermetically seal the joint between a conductor and a casing of a cable or other apparatus, particularly a cable employed in transoceanic communication systems.

Another object of the invention is to permit the coupling of associated apparatus to an undersea cable without endangering the internal elements of the apparatus or cable by corrosion or leakage.

In accordance with one embodiment of this invention, the seal is utilized for a terminal connection for a cable or other apparatus subject to high hydrostatic pressure encountered at deep sea levels and comprises a central conductor hermetically sealed to the inner wall of an insulating mass or sleeve member. A thick walled metallic member, casing or cable sheath surrounds the sleeve and is provided with a thin wall portion at one end and a tapered wall portion intermediate the thin wall and the thick wall of the casing. The thin wall end portion is hermetically sealed to the outer surface of the sleeve over a distance corresponding to the length of the seal between the conductor and the inner wall of the sleeve. This arrangement provides an impervious and permanent seal which is cable of withstanding extreme pressures usually encountered at deep sea levels.

A feature of the invention relates to the interposition of a pressure relieving or cushion material between the tapered portion of the casing and the insulating sleeve member from a point in alignment with the termination of the seal to the inner end of the sleeve to aid in supporting the reduced diameter wall portion of the casing to a point where the casing wall is sufficiently strong to withstand the hydrostatic pressure bearing against the casing.

A further feature of the invention relates to an additional function of the cushion material on the external surface of the sleeve member in which the foremost end of the material terminates the hermetic seal abruptly between the sleeve and the cable sheath at a point where strains are apt to occur due to difference in expansion and contraction of the sleeve and the sheath. This point is reached where the sheath wall increases in cross-section to such an extent that it is rigid and is incapable of yielding rapidly to differences of expansion and contraction set up in the sleeve material.

Other features of the invention are concerned with the method of producing the impervious joint between the conductor and the sleeve and the sleeve and the sheath to withstand the hydrostatic pressures encountered at deep sea levels. These features embody the formation of the concentric and coextensive seals between the conductor and sheath, the application of the pressure relieving layer on the sleeve and various details of fabrication to produce a strong hermetic and non-corrosive insulated union between the conductor and the protective sheath of the cable.

The invention will be more clearly understood from the following detailed description when considered with the accompanying drawing:

Fig. 1 is a cross-sectional view of one embodiment of the invention prior to the final sealing operation and shows the relationship of the elements for producing the insulated conductor for a cable seal;

Fig. 2 is another view in cross-section of the seal of this invention showing the concentric joints after the final sealing operation.

Fig. 3 shows in cross-section a modification of the preliminary seal between the conductor and the insulating mass in which a bead is first fused to the conductor;

Fig. 4 illustrates the form of the insulating mass on the conductor and shows a modified arrangement of the cushion layer partly in cross-section;

Fig. 5 is another modification of the seal of this invention partly in section illustrating the location of a metallic ring on the insulating mass for terminating the sealing between the mass and the cable sheath; and Fig. 6 is a view in elevation of the completed cable seal as embodied in this invention.

The seal of this invention is primarily concerned with apparatus, such as transoceanic cable and other related equipment, which is located at great depths of the sea where enormous hydrostatic pressures are encountered. In order to protect the cable from the corrosive action of sea water and also to maintain the electrical constants of the cable or associated apparatus stable, it is essential to prevent the entrance of sea water in the cable. Furthermore, the efficiency of the seal is dependent on the simplicity of assembly and the elimination of cumbersome packing or the use of absorbent material which eventually decomposes due to corrosion.

In accordance with one of the aspects of this invention as disclosed in Figs. 1 and 2, a central conductor 10, of tungsten, "Dumet" or "Fernico", an alloy of iron, nickel and cobalt, or other suitable conducting metal or alloy is provided with an insulating mass or filler 11, preferably of glass of the "hard" variety, such as boro-silicate glass, commercially known as "Pyrex" or "Nonex" glass. The thickness of the glass mass will depend on the pressures existing in the locality where the cable or other apparatus is to be laid. For instance, at extreme depths the pressure may attain a value between 10,000 to 12,000 pounds to the square inch and it will be necessary to apply the required thickness of glass mass to the conductor 10 which will withstand the crushing pressure encountered at such depths. Another factor to be considered in producing an efficient seal in accordance with this invention is the coefficients of expansion and contraction of the conductor and the glass mass. The coefficients of the metal should be substantially the same or as near as possible as the glass mass to effect a perfect union or weld when heated, to fuse these elements together and maintain a hermetic joint under the conditions of actual operation.

In conformity with the latter requirement, the predominant factor in the selection of the appropriate materials for the production of the seal of this invention may be either the conductor or the glass insulating mass. Naturally, if the paramount requirement is a glass mass having a crushing pressure of high rating, it will be essential to employ a "Nonex" glass having very hard properties, such as 702 P. glass. On the other hand, the conductor material may be the controlling factor and, in that event, it will be necessary to employ a glass material having the same or substantially the same coefficients. As examples of appropriate materials, the following are set forth. Under extreme conditions of use, the glass mass would be the 702 P. boro-silicate glass which has coefficients close to tungsten, so that the conductor for the seal would be formed of this metal. If "Fernico" is used as the conductor, a glass of higher coefficients would be selected, such as 705 AO boro-silicate glass.

In following the steps of fabricating the sealed joint of this invention, a preliminary seal is produced between the conductor 10 and the glass mass 11 which is in the form of an elongated sleeve. It is preferable to provide a sleeve having an inside diameter closely simulating the diameter of the conductor 10. The sleeve surrounds the conductor and heat is applied to the sleeve and conductor uniformly to prevent stresses being set up in the glass mass during fabrication. When the proper working temperature of the glass is reached, the intermediate portion of the glass mass, as shown at A in Fig. 1, is heated to a plastic state in order to "wet" the glass to the surface of the conductor 10 and form a hermetic weld or union therewith over the area indicated. After the preliminary seal is completed and the surface of the sleeve is made smooth and concentric with the conductor by grinding or polishing, a thin layer 13 of pressure relieving material is applied over the outer surface of the sleeve beyond the preliminary seal as shown at B in Fig. 1. This layer may be in the form of a thin tubing of metal, such as copper, nickel or other suitable metal or alloy. The layer may also be applied on the sleeve by electrodeposition or applied as a film of material not readily wetted by glass in a plastic state, such as graphite. The layer should be relatively thin, for instance, about .002 inch in thickness. A method of gauging the thickness of the layer of pressure relieving material may be resorted to as shown in Fig. 4 in which the outer portion of the sleeve 11 is undercut by grinding and polishing as shown at 14 and the layer of graphite 15 applied over the undercut area to a depth even with the remaining surface of the sleeve.

The assembled unit is now ready to be sealed into a cable sheath 16 which may be made of copper which readily seals to the glass mass 11. In order to provide a tight joint between the glass mass and the thick walled cable sheath 16, the end of the sheath intended to be hermetically sealed to the glass is reduced in thickness to a fine knife-like edge so that the portion 17 coextensive with the layer 13 is tapered to a greatly reduced diameter at the termination of the line between A and B and the remaining portion 18 is gradually reduced in thickness until the edge is rendered sharp or knife-like and the portion 18 is very pliant. The tapering of the metallic element of the seal and the method of forming a hermetic seal with a glass element is more clearly disclosed in W. G. Housekeeper, U. S. Patent 1,294,466 dated February 18, 1919.

When the knife edge taper is produced on the cable sheath 16, the coated conductor 10 is inserted in the sheath with the layer 13 in contact with the inner wall of the sheath over an area substantially coextensive with the tapered portion 17 of the sheath while the knife-like portion 18 surrounds the area of the mass 11 coextensive with the preliminary seal previously described. It will be noted that in the arrangement, as shown in Fig. 1, the thin film or layer 13 causes the inner surface of the portion 18 of the sheath to be spaced away from the surface of the glass mass 11. This is the relative position of the elements of the seal in the form of the invention being discussed prior to the final heating operation. A heating flame is applied to the glass mass 11 and the knife edge portion 18 of the sheath, and when the glass is rendered plastic the surface tension of the metal and glass causes the glass to adhere or weld to the thin metal portion 18 as shown in Fig. 2 and forms a permanent hermetic union or seal over the area designated A in Fig. 1. This produces two concentric and coextensive sealed joints in which the glass mass is sealed to the conductor and the cable sheath to form a perfectly insulated conductor connection for a cable capable of withstanding the hydrostatic pressures encountered at deep sea pressures.

The thin portion 18 of the cable sheath which has a coefficient of expansion different from that of the glass is capable of adhering to the glass regardless of this difference in expansion due to the pliant nature of the metal up to a point where the metal is more rigid. Therefore, in accordance with the invention, the thin film or layer of material 13 provides the means for terminating the seal between the glass and the metal abruptly at a point where the metal is not sufficiently pliant to yield under conditions of stress caused by expansion and contraction and where the differences in expansion between the glass and the metal would cause abnormal strains which might fracture the glass or metal sheath and permit the entrance of moisture. The film or layer 13 of cushion material also has another useful function by protecting the portion of the glass mass which it covers in relieving or cushioning the external pressure bearing against the tapered portion 17 of the sheath over the area from the seal to the normal thick wall of the sheath. The layer 13 reinforces the cable sheath portion 17 where it is of insufficient thickness to withstand the external pressure to a point where the normal wall thickness of the sheath is sufficient to withstand such pressures.

Any of the combinations of metal and glass, as previously described, may be produced by a method of procedure, as shown in Fig. 3, in which a glass bead 12 is first sealed or fused to the conductor and then the sleeve 11 placed over the bead and fused thereto by heating. For instance, the tungsten, "Fernico" or "Dumet" conductor may be provided with a bead of the appropriate glass having the proper coefficients of expansion and contraction and then a sleeve 11 of similar glass may be sealed to the bead as previously described.

In Fig. 5, another modification of the invention is shown in which the cushion layer is omitted. In this form, the glass mass is provided with a groove 19 and a metallic split ring 20 is seated in the groove to terminate the seal between the glass mass 11 and the thin portion 18 of the cable sheath. The outer surface of the ring lies flush with the unsealed surface of the mass 11 and this surface is in contact with the tapered portion 17 of the sheath so that the external pressure exerted on the weak wall portion 17 of the sheath is counteracted by the strength of the glass mass.

While the invention has been described concerning a specific cable sheath material of copper, other metals may be similarly employed in producing the sealed joints for the conductor. Furthermore, the novel features of the invention are capable of application in other fields unrelated to undersea cable connections and, therefore, the invention should only be limited within the scope of the appended claims.

What is claimed is:

1. A sealed joint adapted to withstand high hydrostatic pressure which comprises a metallic casing having a thick walled portion, a conductor projecting from said casing, an insulating sleeve surrounding said conductor and having an internal portion thereof sealed to said conductor, said casing having a thin walled portion coextensive with the sealed joint between said conductor and said sleeve and being sealed to the exterior of said sleeve, an intermediate tapered portion connecting said thin walled portion and said thick walled portion of said casing, and a seal terminating member on said sleeve within said casing adjacent said thin walled portion.

2. An insulated conductor seal capable of sustaining hydrostatic pressures of the order encountered at oceanic depths which comprises a conductor, an elongated insulating sleeve engaging said conductor and having an intermediate portion thereof hermetically fused to the surface of said conductor, a wrapper of cushion material on said sleeve rearwardly of said fused intermediate portion, and a thick walled metallic sheath surrounding said conductor, said sheath having a knife edge termination and a tapered portion intermediate said termination and thick wall, the knife edge portion being fused to said sleeve over an area coincident to said fused intermediate portion and said tapered portion engaging said cushion material.

3. An insulated conductor seal for a cable connection capable of maintaining an impervious joint under pressure conditions encountered at deep sea levels which comprises a central metallic member, an insulating mass closely engaging said member and having an intermediate portion thereof hermetically sealed thereto, a cable sheath surrounding said mass having a termination tapering to a knife edge portion, said portion being located along the exterior of said mass for a distance substantially coincident with the hermetically sealed portion and being sealed to said mass to form concentric and coextensive impervious joints between said member, mass and cable sheath, and means between said mass and cable sheath for terminating the seal therebetween at a point where detrimental stresses occur.

4. An insulated conductor seal for a cable connection capable of maintaining an impervious joint under pressure conditions encountered at deep sea levels which comprises a central metallic member, an insulating mass closely engaging said member and having an intermediate portion thereof hermetically sealed thereto, a cable sheath surrounding said mass having a termination tapering to a knife edge portion, said portion being located along the exterior of said mass for a distance substantially coincident with the hermetically sealed portion and being sealed to said mass to form concentric and coextensive impervious joints betwen said member, mass and cable sheath, and means between said mass and cable sheath for sustaining said termination intermediate the seal and the normal wall of said sheath.

5. An insulated conductor seal for a metallic casing comprising a metallic conductor, an insulating sleeve engaging said conductor, a metallic sheath surrounding said sleeve and conductor, concentric hermetically sealed joints between said conductor and sleeve and said sleeve and sheath, and a cushion material between said sheath and sleeve adjacent the sealed joint therebetween.

6. An insulated conductor seal for a cable connection comprising a metallic conductor, an insulating sleeve engaging said conductor, a metallic cable sheath surrounding said sleeve and conductor, concentric hermetically sealed joints between said conductor and sleeve and said sleeve and sheath, and a seal terminating member on said sleeve adjacent the sealed joint between said sleeve and sheath.

7. An insulated conductor seal for a cable connection comprising a metallic conductor, an insulating sleeve engaging said conductor, a metallic cable sheath surrounding said sleeve and conductor, concentric hermetically sealed joints between said conductor and sleeve and said sleeve and said sheath, and a metallic layer between said sheath and sleeve adjacent the sealed joint therebetween.

8. An insulated conductor seal for a cable connection comprising a metallic conductor, a fixed insulating sleeve engaging said conductor, a metallic cable sheath surrounding said sleeve and conductor, concentric hermetically sealed joints between said conductor and sleeve and said sleeve and sheath, and a copper tubular member embracing said sleeve adjacent the sealed joint between said sleeve and sheath.

9. An insulated conductor seal for a cable connection comprising a metallic conductor, a fixed insulating sleeve engaging said conductor, a metallic cable sheath surrounding said sleeve and conductor, concentric hermetically sealed joints between said conductor and sleeve and said sleeve and sheath, and a layer of graphite material on said sleeve adjacent the sealed joint between said sleeve and sheath.

10. The method of forming a hermetically sealed insulated joint between a conductor and a casing capable of withstanding deep sea pressure which comprises, applying a sleeve of insulating material to said conductor, sealing said conductor to a portion of the inner wall of said sleeve, applying a cushion material to the outer surface of said sleeve from a point substantially in alignment with the inner termination of the seal between said conductor and sleeve to a substantial distance beyond said point, applying the casing over said sleeve, said casing having a thin walled portion lying parallel and coincidental with said sealed joint, and a wall portion increasing in diameter from said thin walled portion to the body of said casing, said tapered wall portion lying adjacent said cushion material, sealing said thin wall portion to said sleeve, and terminating the latter sealing abruptly at the edge of said cushion material.

11. The method of hermetically sealing a conductor in a metallic sheath to withstand high pressures at sea floor levels which comprises, forming an internal fused joint between the conductor surface and an insulating sleeve in contact with said surface, surrounding said sleeve with a cushion layer beyond said fused joint, applying the metallic sheath over said layer, tapering said sheath gradually to a knife edge portion, and fusing said knife edge portion to the exterior of said sleeve over an area from the beginning of said internal fused joint to the edge of said cushion material.

12. In the manufacture of a seal for a conductor in a cable sheath to withstand high pressures at deep sea levels, which includes a central conductor concentric with the sheath, and insulating filler therebetween, and a pressure relieving material on said filler, the method which comprises, tapering said sheath for an extended length to a knife edge, supporting the tapered portion of said sheath on said filler by the pressure relieving material, producing concentric fused joints between said conductor and filler and between said filler and sheath over a definite area of length, and terminating the joint of said filler and knife edge portion abruptly at the adjacent edge of said material.

13. In the manufacture of a seal for a conductor in a cable sheath to withstand high pressures at deep sea levels, which includes a central conductor concentric with the sheath, an insulating filler therebetween, and a pressure relieving layer on said filler, the method which comprises tapering said sheath for an extended length to a knife edge, producing an internal seal between an intermediate portion of said filler and conductor, inserting the united conductor and insulating filler within the sheath, sealing said knife edge portion to said filler over an area coincident with said first seal, and applying a pressure relieving layer to the surface of said filler from a point of the termination of the seal between said filler and sheath over the area covered by the sheath portion of insufficient thickness to withstand external pressures encountered at deep sea levels to the sheath portion of sufficient thickness to withstand such pressures.

14. The method of hermetically sealing an insulated conductor in a metallic sheath to withstand high pressures at sea floor levels which comprises, fusing a glass bead to said conductor, heating an insulating filler to closely surround said conductor and fuse to said bead, applying a metallic material to the exterior surface of said filler from a point in the plane of the termination of said bead to the end of said filler, inserting the insulated conductor within a cable sheath having a tapered wall terminating in a knife edge portion, heating said knife edge portion and filler over an area defined by said bead, fusing said portion to said filler over said area, and terminating the fusion thereof at the junction of said portion and metallic material.

VICTOR L. RONCI.